(12) United States Patent
Tatsuoka et al.

(10) Patent No.: US 7,496,490 B2
(45) Date of Patent: Feb. 24, 2009

(54) MULTI-CORE-MODEL SIMULATION METHOD, MULTI-CORE MODEL SIMULATOR, AND COMPUTER PRODUCT

(75) Inventors: Masato Tatsuoka, Kawasaki (JP); Atsushi Ike, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 246 days.

(21) Appl. No.: 11/362,828

(22) Filed: Feb. 28, 2006

(65) Prior Publication Data

US 2007/0101318 A1 May 3, 2007

(30) Foreign Application Priority Data

Oct. 31, 2005 (JP) ............................. 2005-316817

(51) Int. Cl.
*G06F 9/455* (2006.01)
(52) U.S. Cl. ............................. 703/14; 703/20; 716/5; 716/8; 712/214; 714/724
(58) Field of Classification Search .................. 703/22, 703/21, 20, 14; 716/4, 5, 8; 712/214, 37; 714/727; 717/106
See application file for complete search history.

(56) References Cited

U.S. PATENT DOCUMENTS

| | | | | |
|---|---|---|---|---|
| 6,427,224 B1 * | 7/2002 | Devins et al. | .................. | 716/4 |
| 6,487,699 B1 * | 11/2002 | Devins et al. | .................. | 716/4 |
| 6,678,645 B1 * | 1/2004 | Rajsuman et al. | ............. | 703/20 |
| 6,996,799 B1 * | 2/2006 | Cismas et al. | ................ | 717/106 |
| 7,114,055 B1 * | 9/2006 | Baxter | ......................... | 712/37 |
| 2003/0093764 A1 * | 5/2003 | Devins et al. | .................. | 716/5 |
| 2004/0010401 A1 * | 1/2004 | Davis et al. | .................. | 703/14 |
| 2005/0144577 A1 * | 6/2005 | Devins et al. | .................. | 716/5 |
| 2006/0179279 A1 * | 8/2006 | Jones et al. | ................. | 712/214 |
| 2006/0225015 A1 * | 10/2006 | Synek et al. | .................. | 716/8 |
| 2007/0016880 A1 * | 1/2007 | Brinson et al. | ................. | 716/5 |
| 2007/0022342 A1 * | 1/2007 | Picano et al. | ............... | 714/727 |
| 2007/0078640 A1 * | 4/2007 | Gabor et al. | .................. | 703/21 |

FOREIGN PATENT DOCUMENTS

| | | |
|---|---|---|
| JP | 4-352262 | 12/1992 |
| JP | 5-35534 | 2/1993 |
| JP | 2001-256267 | 9/2001 |

* cited by examiner

*Primary Examiner*—Paul L Rodriguez
*Assistant Examiner*—Kandasamy Thangavelu
(74) *Attorney, Agent, or Firm*—Staas & Halsey LLP

(57) ABSTRACT

Core model processing of a processor model PE1 and a processor model PE2 is serialized. Therefore, processing time for the inter-core-model communication is required between the core model processing of a first processor model and the core model processing of a second processor model. The inter-core-model communication processing is performed such that the inter-core-model communication required for the simulation processing of a multi-processor model is performed in parallel with the core model processing.

9 Claims, 17 Drawing Sheets

SIMULATION PROCESSING TIME

FIG.11
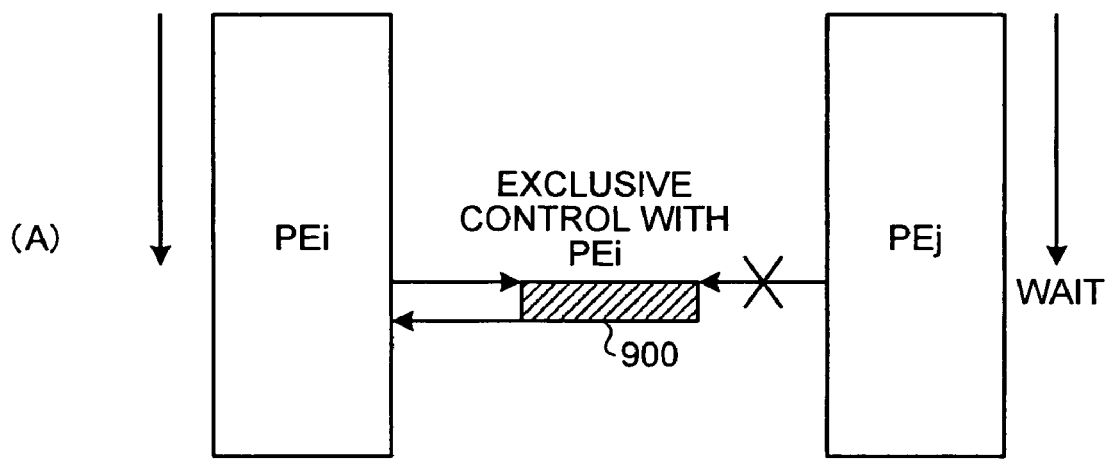
(A)
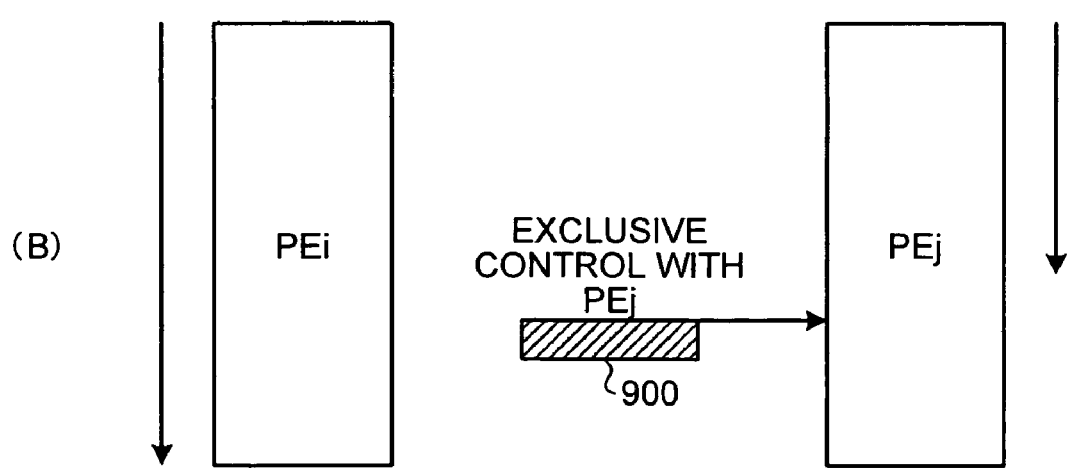
(B)

MULTI-CORE-MODEL SIMULATION METHOD, MULTI-CORE MODEL SIMULATOR, AND COMPUTER PRODUCT

CROSS-REFERENCE TO RELATED APPLICATIONS

This application is based upon and claims the benefit of priority from the prior Japanese Patent Application No. 2005-316817, filed on Oct. 31, 2005, the entire contents of which are incorporated herein by reference.

BACKGROUND OF THE INVENTION

1. Field of the Invention

The present invention relates to a technology for a multi-core model simulation for performing a simulation of inter-core-model communication in a multiprocessor and a system-on-a-chip (SoC) model.

2. Description of the Related Art

The recent trend has been for a central processing unit (CPU) to shift to a multi-core processor. In addition to a general-purpose CPU, an embedded type CPU has been shifting to the multi-core processor. To reduce a development period of a system large-scale integration (LSI), which has been becoming increasingly complicated, it is important to co-design hardware and software in an early stage of the design. However, a conventional simulator cannot support the multi-core processor. In addition, a simulation speed of the conventional simulator is not sufficiently high. Therefore, development of a high-speed software-hardware-coordinated simulator has been demanded.

A conventional multi-processor model simulator is explained with two processor models PE1 and PE2 having a core model as an example. FIG. 1 is a flowchart of a simulation in a conventional multi-processor model and FIG. 2 is a timing chart of the simulation.

First, it is determined whether to perform a simulation on a target program (step S2201). If it is determined not to perform the simulation ("NO" at step S2201), the process is finished. On the other hand, if it is determined to perform the simulation ("YES" at step S2201), variables are specified (step S2202) and a core-model processing of the processor model PE1 is executed (step S2203). Specifically, the specified variables are sequentially applied to an instruction execution function of the processor model PE1 to execute the core-model processing of the processor model PE1.

When the core-model processing of the processor model PE1 is completed, the specified variables are sequentially applied to an instruction execution function of the processor model PE2 to execute the core-model processing of the processor model PE2 (step S2204). When the core-model processing of the processor model PE2 is completed, one loop of the simulation is completed. Then, the processing proceeds to step S2201. As shown in FIG. 2, the processing is executed in the order of the processor model PE1, processor model PE2, processor model PE1, processor model PE2, . . . .

The execution processing of the core model processing of the processor model PE1 (step S2203) is specifically described. It is determined whether there is an unexecuted instruction (step S2211). If there is no unexecuted instruction ("NO" at step S2211), the process proceeds to the core model execution processing of the processor model PE2 (step S2204).

On the other hand, if there is an unexecuted instruction ("YES" at step S2211), the unexecuted instruction is fetched (step S2212) and executed (step S2213). It is then checked whether an interruption processing has been performed (step S2214), and the processing returns back to step S2211.

In the core model execution processing of the processor model PE2 (step S2204), it is determined whether there is an unexecuted instruction (step S2221). If there is no unexecuted instruction ("NO" at step S2221), the process proceeds to step S2201.

On the other hand, if there is an unexecuted instruction ("YES" at step S2221), the unexecuted instruction is fetched (step S2222) and executed (step S2223). It is then checked whether an interruption processing has been performed (step S2224), and the process returns goes back to step S2221.

In this simulator, since the multi-processor model sequentially executes instruction execution of one core for each core, a communication processing between the cores (inter-core-model communication) is performed when instruction execution of a core is completed and while instruction execution of the next core is performed. If an interruption to the processor model PE2 is detected at step S2214 of the processor model PE1, communication from the processor model PE1 to the processor model PE2 is performed to temporarily execute the core model processing of the processor model PE2. Such a technology is disclosed in, for example, Japanese Patent Application Laid-Open Publication Nos. H5-35534, H4-352262 and 2001-256267.

However, in a conventional simulation mode described above, since execution processing (step S2203, step S2204) of processor models PE1 and PE2 is serialized, the simulation time is increased more and more.

Since execution processing (step S2203, step S2204) of processor models PE1 and PE2 is serialized, if the interruption processing is performed in the processor model PE1 for the processor model PE2, the core model processing of the processor model PE2 can be temporarily executed by performing inter-core-model communication with the processor model PE2.

If interruption processing is performed in the processor model PE2 for the processor model PE1, since an instruction to be executed by the interruption has already been finished in the processor model PE1, communication cannot be performed with the processor model PE1. Therefore, it is necessary to wait until the instruction execution of the processor model PE1 in the next loop. As a result, the simulation time further increases.

Although a multi-processor model is used in a technology disclosed in Japanese Patent Application Laid-Open Publication No. 1993-35534, the inter-core-model communication is not synchronized between processor models. Consequently, similarly to the conventional simulator shown in FIG. 1 and FIG. 2, the simulation time increases.

Thus, in the conventional simulator, due to the increase of the simulation time, a speed of the simulation is reduced. As a result, a development period for a device that includes the target program is delayed.

SUMMARY OF THE INVENTION

It is an object of the present invention to at least solve the above problems in the conventional technology.

A computer-readable recording medium according to one aspect of the present invention stores a simulation program for executing a plurality of core models in parallel. The simulation program makes a computer execute synchronizing an instruction being executed by a first core model and an instruction being executed by a second core model; and causing communication from the first core model to the second core model.

A simulator according to another aspect of the present invention is for executing a plurality of core models in parallel. The simulator includes a communicating unit configured to cause communication from a first core model to a second core model while synchronizing an instruction being executed by the first core model and an instruction being executed by the second core model.

A simulation method according to still another aspect of the present invention is for executing a plurality of core models in parallel. The simulation method includes synchronizing an instruction being executed by a first core model and an instruction being executed by a second core model; and causing communication from the first core model to the second core model.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 11 is a schematic for illustrating a multi-core model simulation according to a second example;

DETAILED DESCRIPTION OF THE PREFERRED EMBODIMENTS

Exemplary embodiments according to the present invention will be explained in detail with reference to the accompanying drawings.

The multi-core model simulator according to the present embodiment is a simulator plural core models. A core model, which reads to execute a target program of the simulation, provided in each processor model may one ore more. In the following, a case in which a single core model is provided in each processor model is explained.

Figure 3:
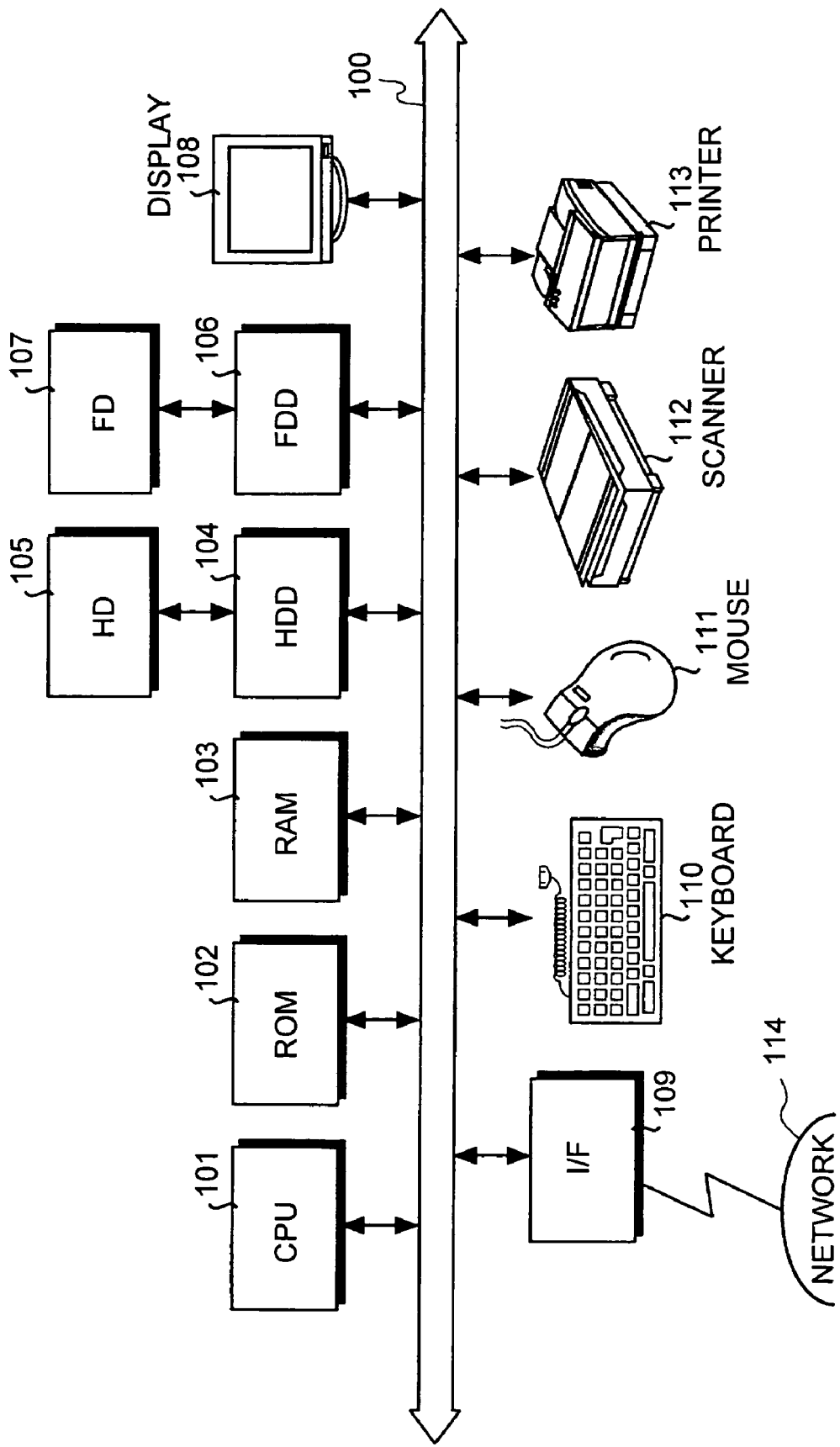
FIG. 3 is a schematic of a multi-core model simulator according to an embodiment of the present invention.

FIG. 3 is a schematic of a multi-core model simulator according to an embodiment of the present invention. As shown in FIG. 3, the multi-core model simulator includes a CPU 101, a read-only memory (ROM) 102, a random-access memory (RAM) 103, a hard disk drive (HDD) 104, a hard disk (HD) 105, a flexible disk drive (FDD) 106, a flexible disk (FD) 107 as an example of a removable recording medium, a display 108, an interface (I/F) 109, a keyboard 110, a mouse 111, a scanner 112, and a printer 113. Each component is respectively connected through a bus 100.

The CPU 101 controls the whole of the multi-core model simulator. The ROM 102 stores programs such as a boot program. The RAM 103 is used as a work area of the CPU 101. The HDD 104 controls read/write of data from/to the HD 105 in accordance with a control of the CPU 101. The HD 105 stores data written by the HDD 104.

The FDD 106 controls read/write of data from/to the FD 107 in accordance with a control of the CPU 101. The FD 107 stores data written by the FDD 106 and allows the multi-core model simulator to read the data stored in the FD 107.

As a removable recording medium, besides the FD 107, a compact-disc read-only memory (CD-ROM), a compact-disc recordable (CD-R), a compact-disc rewritable (CD-RW), a magneto-optical disk (MO), a digital versatile disk (DVD), or a memory card may be used. The display 108 displays a cursor, icons, and tool boxes as well as data such as a document, an image, and function information. As the display 108, a cathode-ray tube (CRT), a thin-film-transistor (TFT) liquid-crystal display (LCD), and a plasma display may be used.

The I/F 109 is connected, via a communication line, to a network 114 such as the internet, and is connected to other apparatuses via the network 114. The I/F 109 functions as an interface between the network 114 and the apparatus, and controls input/output of data from/to an external apparatus. As the I/F 109, a modem, and a LAN adaptor may be used.

The keyboard 110 includes keys for inputting characters, numerals, and various instructions, and inputs various data to the apparatus. A touch-panel type input pad, and a numeric keypad may be also used instead. With the mouse 111, shift of a cursor, selection of an area, change of a position and a size of a window are performed. A trackball or a joystick may be used instead, as long as similar functions are provided as a pointing device.

The scanner 112 optically reads an image and captures image data into the delay analysis apparatus. The scanner 112 may have an optical character reader (OCR) function. The printer 113 prints image data and document data. As the printer 113, a laser printer or ink-jet printer may be used.

Figure 1:
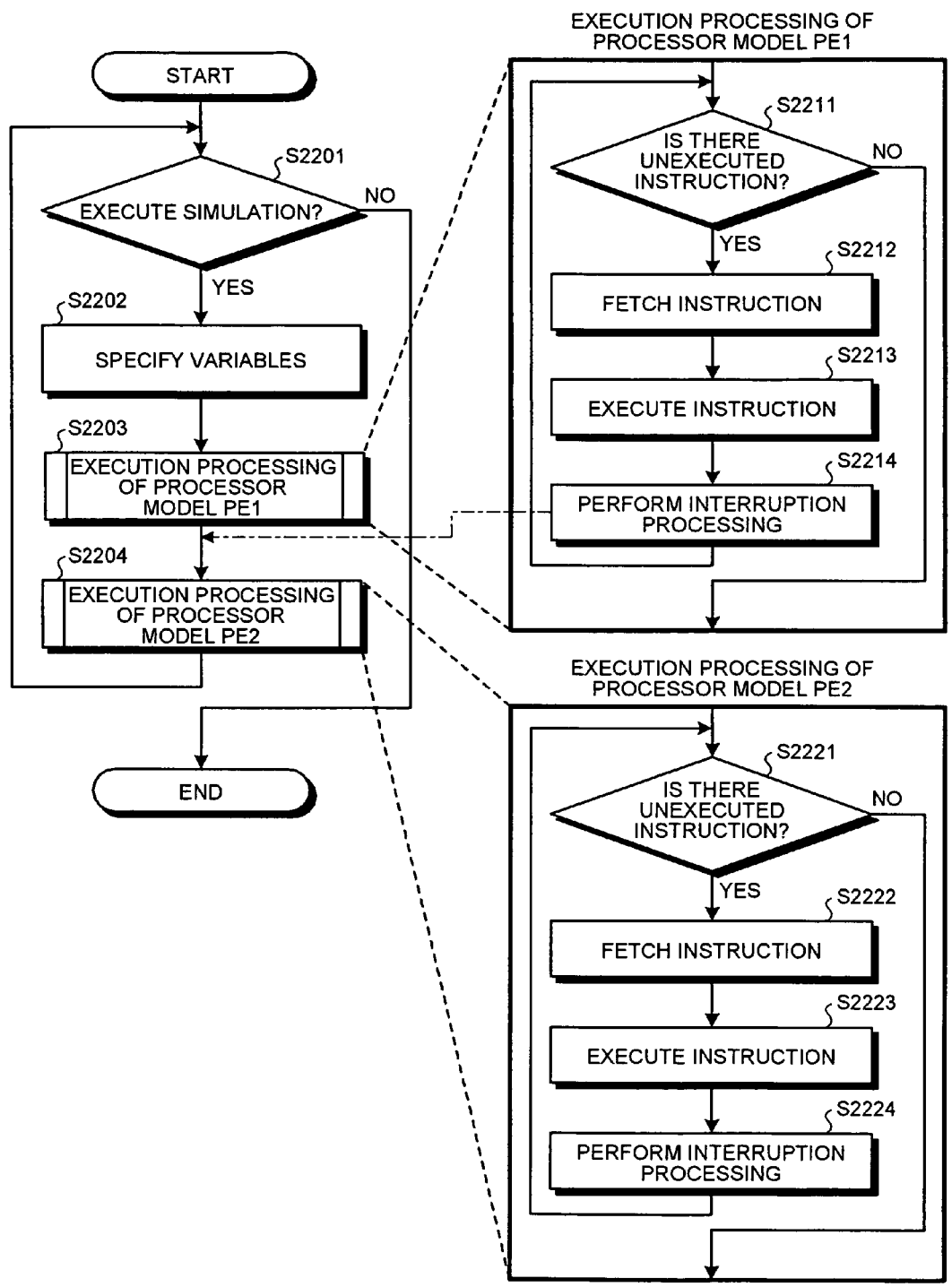
FIG. 1 is a flowchart of a simulation in a conventional multi-processor model.
Figure 2:
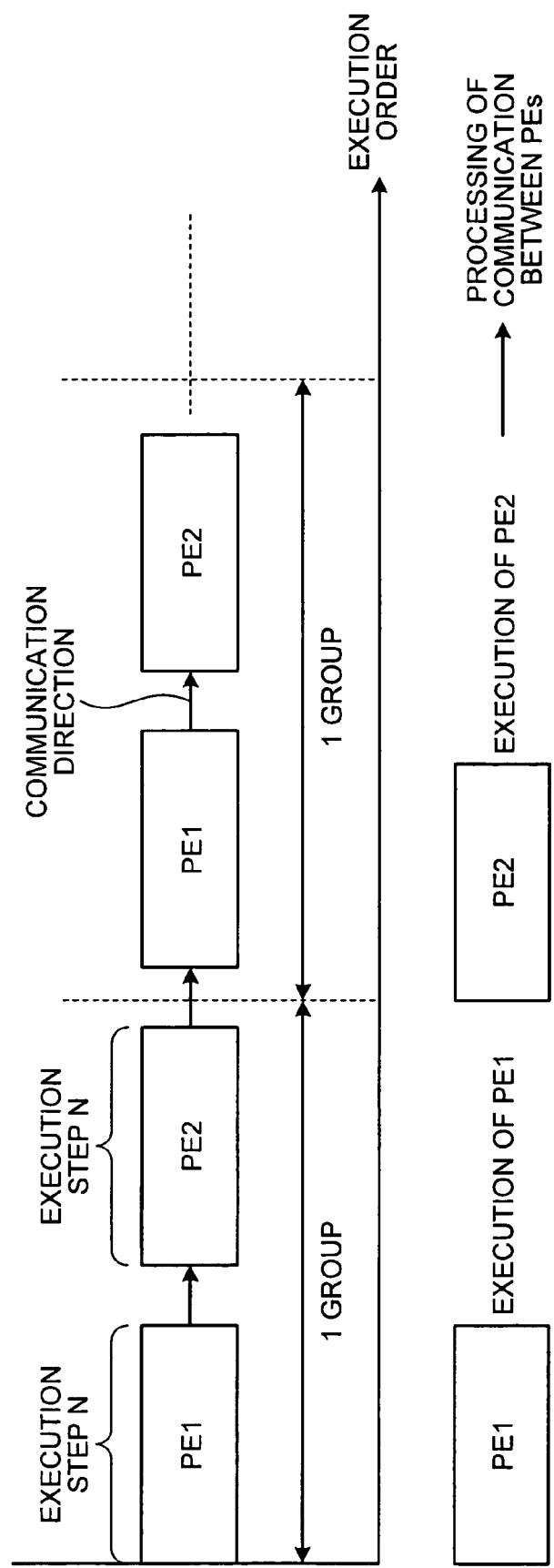
FIG. 2 is a timing chart of the simulation in the conventional multi-processor model.

Unlike the conventional multi-core model simulation shown in FIG. 1, each core model is executed in parallel. Therefore, communication between core models can be performed asynchronously. However, if a presence of communication from another core model is checked every time an instruction is executed, in the embodiment, the number of processing increases. Therefore, simulation processing is performed such that the number of inter-core communication is lessened. Thus, without degrading performance based on the parallel execution of the core model processing, the inter-core-model communication can be realized. As a result, the simulation processing time can reduced.

In flowcharts, "Sxxx-i" (xxx is a number) represents processing by a processor model PEi. Moreover, "Sxxx-j" represents processing by a processor PEj (j=1 to n, n≧2, j≠i).

Figure 4:
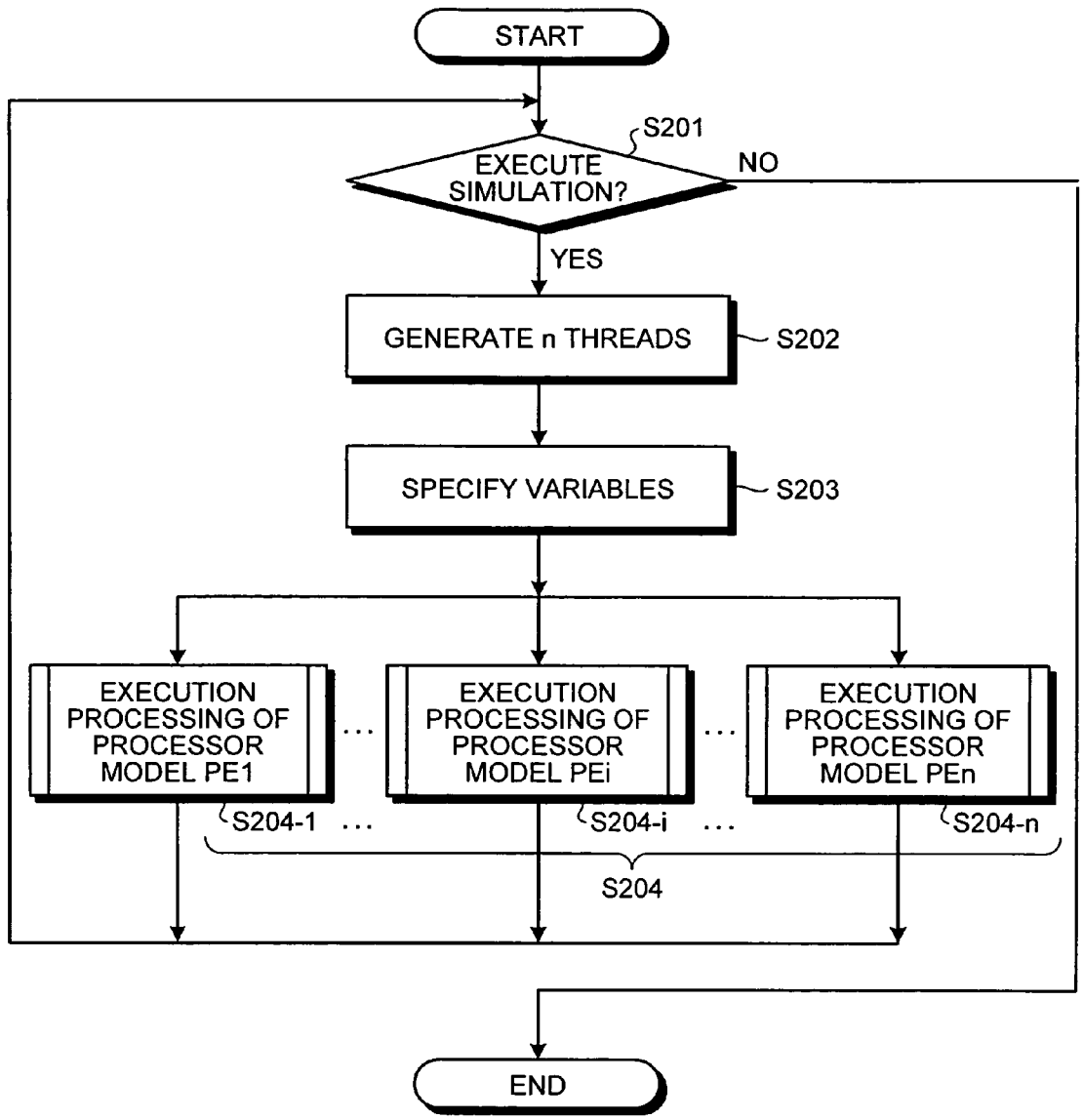
FIG. 4 is a flowchart of a multi-core model simulation by the multi-core model simulator.

FIG. 4 is a flowchart of a multi-core model simulation by the multi-core model simulator. As shown in FIG. 4, first, it is determined whether to execute a simulation on a program (step S201). If it is determined not to execute the simulation ("NO" at step S201), the process is finished.

On the other hand, if it is determined to execute the simulation ("YES" at step S201), n pieces of threads are generated (step S202), and variables are specified for identifying instructions of the processor model PEi (i=1 to n, n≧2) executed in each thread (step S203). For example, if the program has 1000 instructions (program codes), by specifying 1 to 100 as the variables, 100 instructions can be executed in each processor model PEi. If 100 variables are specified for 1 loop (step S201 to step S204-i), the simulation is completed in 10 loops.

The processor model PEi is then executed (step S204-1 to S204-n). Specifically, by applying the variables to an instruction execution function of the processor model PEi, the processor model PE1 to processor model PEn are executed (step S204). If the execution of the processor model PE1 to processor model PEn is completed, the process returns back to step S201.

Figure 5:
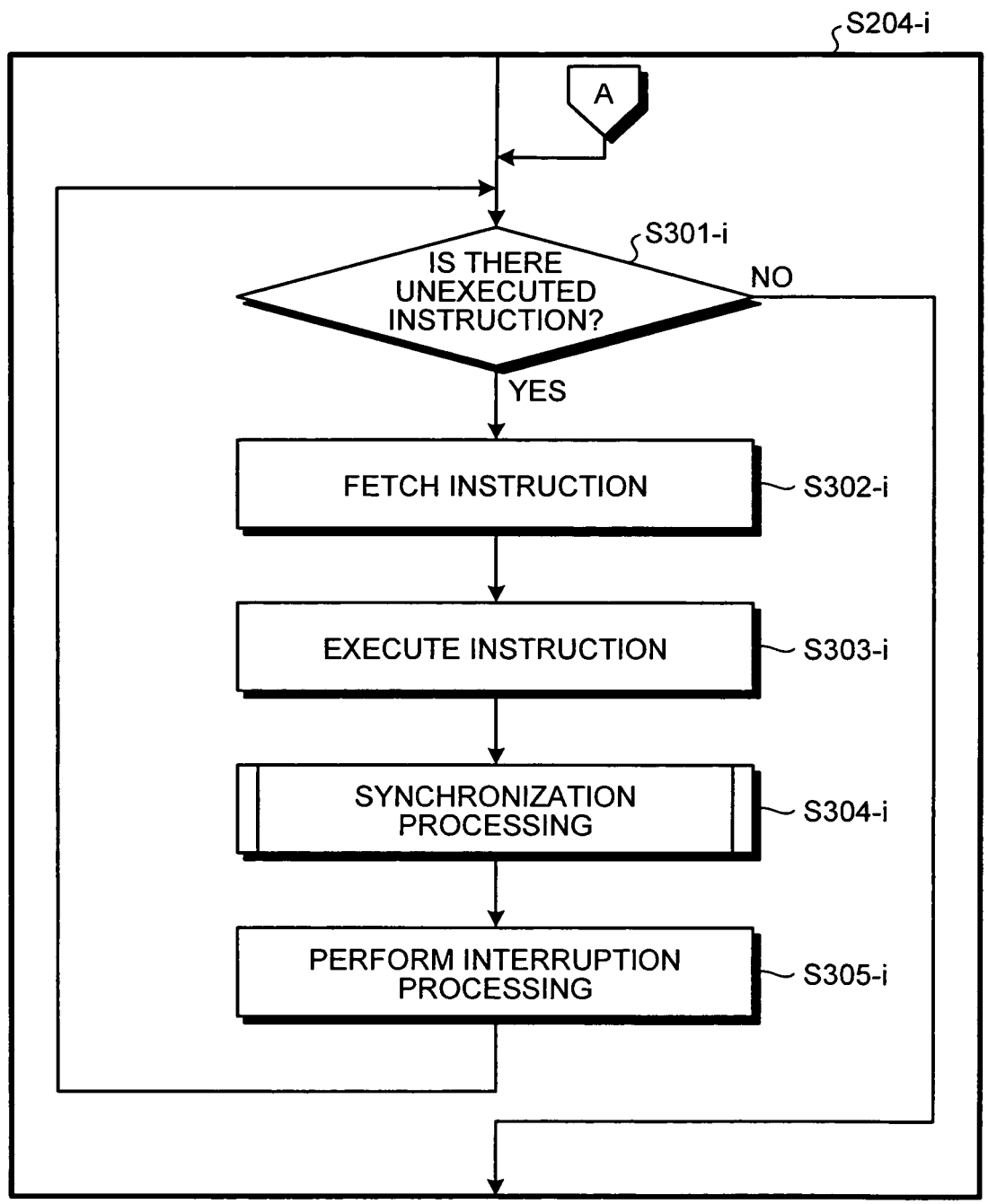
FIG. 5 is a flowchart of an execution processing of a processor model PEi according to the embodiment.

FIG. 5 is a flowchart of an execution processing of the processor model PEi. As shown in FIG. 5, it is determined whether there is an unexecuted instruction (step S301-i). If there is no unexecuted instruction ("NO" at step S301-i), the execution processing of the processor model PEi is finished and the process returns back to step S201.

On the other hand, if there is an unexecuted instruction ("YES" at step S301-i), the unexecuted instruction is fetched (step S302-i) and executed (step S303-i). Subsequently, a synchronization processing is executed (step S304-i), and then, an interruption processing is executed (step S305-i). In the interruption processing, an interruption from another processor model PEi is checked, and the process returns back to step S301-i.

Figure 6:
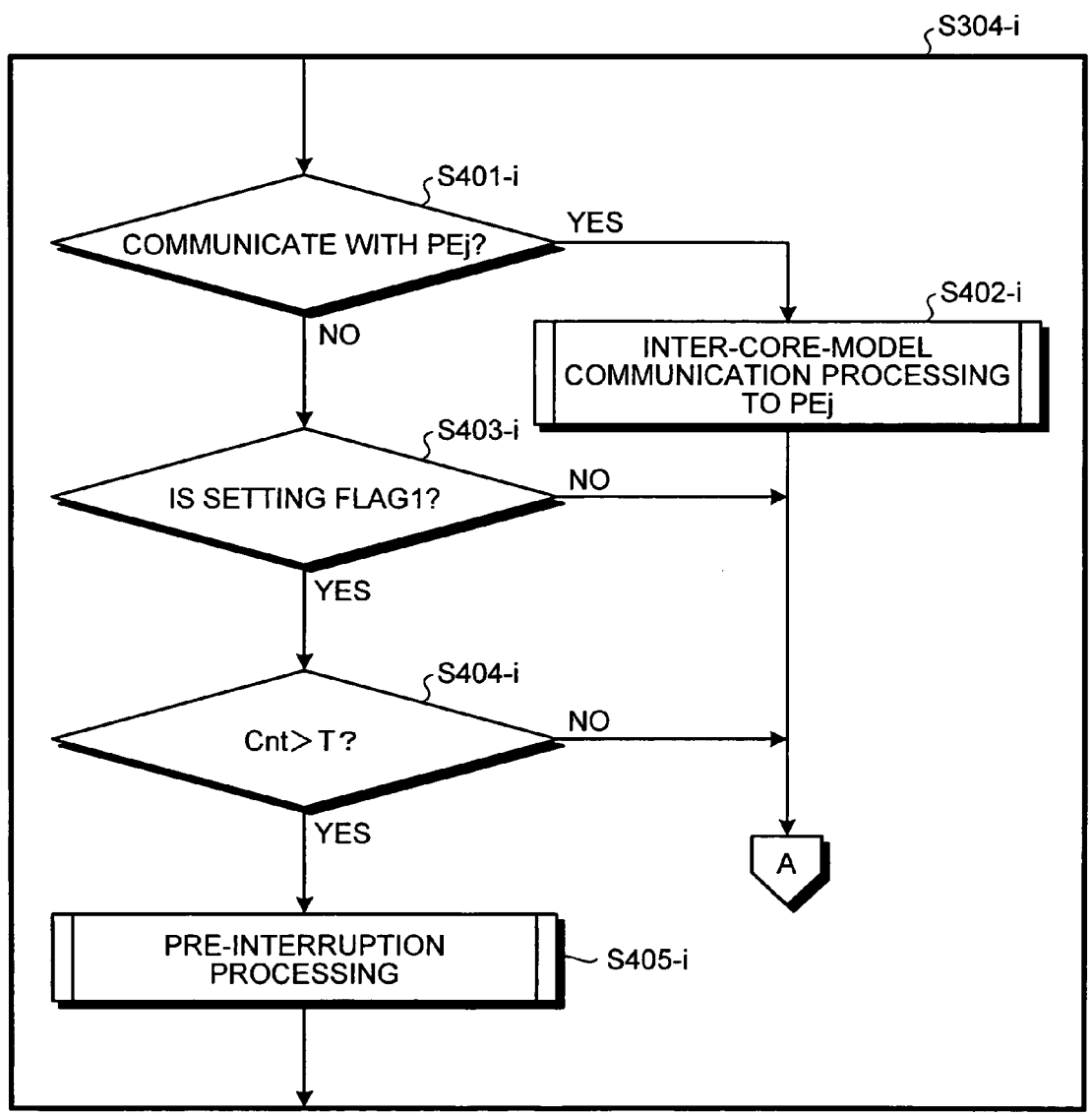
FIG. 6 is a flowchart of a synchronization processing of the processor model PEi.

FIG. 6 is a flowchart of a synchronization processing of the processor model PEi. As shown in FIG. 6, it is determined whether to communicate with another processor model PEj based on a result of the instruction execution at step S303-i (step S401-i). When it is determined to communicate with another processor model PEj ("YES" at step S401-i), inter-core-model communication processing is performed on a processor model PEj with which communication is to be established (step S402-i). After the execution of the inter-core-model communication processing, the process returns back to step S301-i shown in FIG. 5.

On the other hand, if it is determined not to communicate with another processor model PEj ("NO" at step S401-i), it is determined whether a setting flag is "1" (step S403-i). The setting flag is a setting flag for identifying whether communication from another processor model PEj is present. When the setting flag is "1", it is determined that the communication is present, and when the setting flag is "0", it is determined that the communication is not present. However, since the setting flag can be accessed from each core model, it is necessary to determine which core model occupies and accesses the setting flag. An exclusive control used in a multithread programming may be applied.

When the setting flag is "0" ("NO" at step S403-i), the process returns back to step S301-i shown in FIG. 5. On the other hand, when the setting flag is "1" ("YES" at step S403-i), it is determined whether a value of a counter Cnt is larger than a threshold T (step S404-i). The counter Cnt is a loop counter for the number of the instruction execution. The threshold T is a threshold for forcing the inter-core-model communication at an arbitrary number of the instruction execution.

If the counter Cnt is equal to or less than the threshold T ("NO" at step S404-i), the process returns back to step S301-I shown in FIG. 5. On the other hand, if the counter Cnt is larger than the threshold T ("YES" at step S404-i), a pre-interruption processing (step S405-i) is executed. In the pre-interruption processing, for example, a presence of the inter-core-model communication from another processor model PEj is checked, and if the inter-core-model communication is present, variables sent from another processor model PEj are accepted. In the interruption processing (step S305-i), by applying an instruction-execution function to the accepted variables, the interruption of the instruction according on the variables is performed.

Specifically, the processing shown in FIG. 4 to FIG. 6 is realized, for example, by the CPU 101 executing programs recorded on a recording medium, such as the ROM 102, the RAM 103, and the HD 105.

Figure 7:
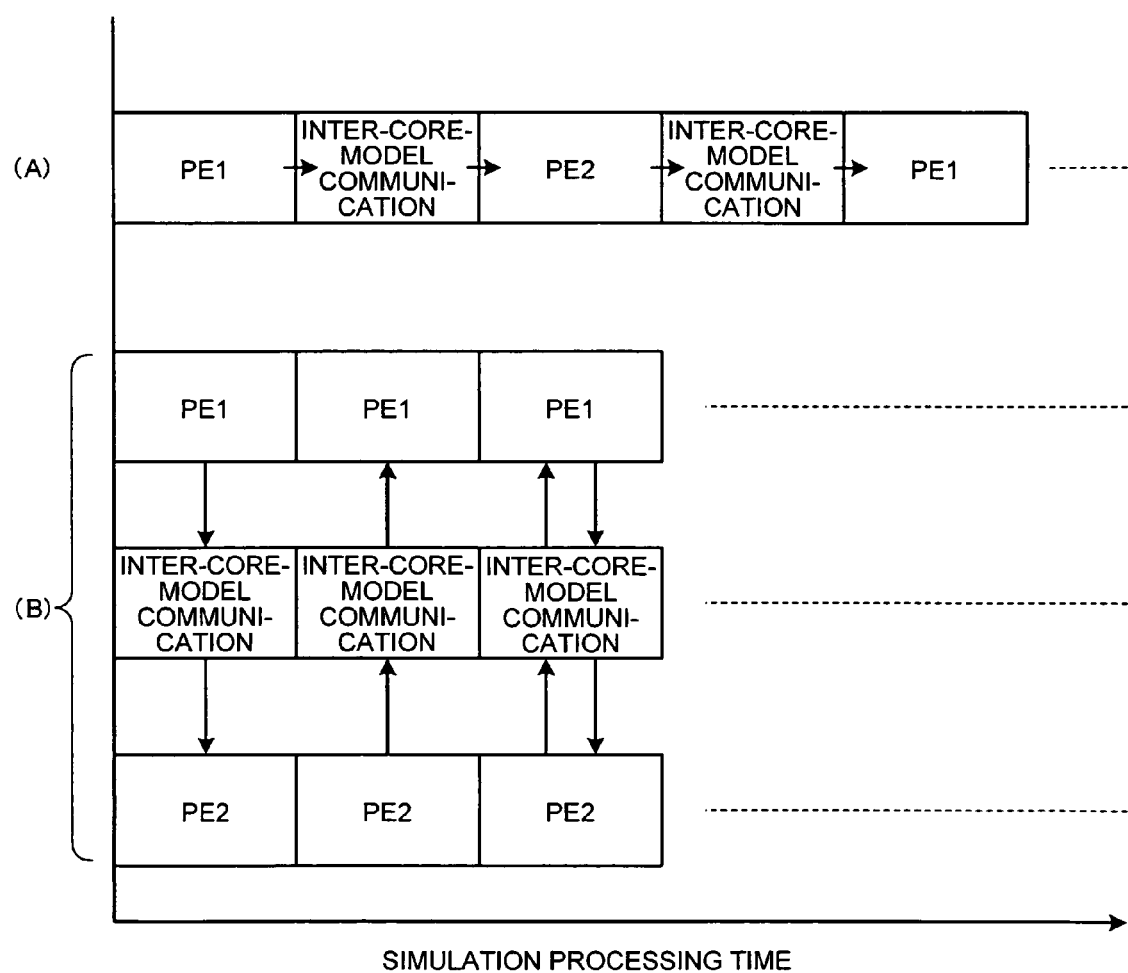
FIG. 7 is a timing chart of a simulation processing in a multi-processor model according to the embodiment of the present invention.

FIG. 7 is a timing chart of a simulation processing in a multi-processor model. In a conventional multi-processor model, since core model processing of a processor model PE1 and a processor model PE2 is serialized, a processing time for the inter-core-model communication from the processor model PE1 to the processor model PE2 is required between the core model processing of the processor model PE1 and the core model processing of the processor model PE2.

If the core model communication to the processor model PE1 is required during the instruction execution of the processor model PE2, to call the required instruction, the core model processing of the processor model PE1 must be executed again from the beginning. As a result, the simulation time, which includes the core model processing time and the inter-core-model communication processing time, increases.

On the other hand, according to the simulation processing according to the embodiment, the inter-core-model communication processing can be performed such that the inter-core-model communication required for the simulation processing is hidden behind the core model processing time, in other words, the inter-core-model communication processing is performed in parallel with the core model processing.

The inter-core-model communication itself can also be performed in parallel. Therefore, not only the simulation speed can be made higher, but also the parallel execution can be achieved without terminating an instruction being executed on a core. Thus, a simulation can be realized for a model closest to a real device.

The first embodiment is an example of directly executing the inter-core-model communication processing from the processor model PEi to the processor model PEj.

Figure 8:
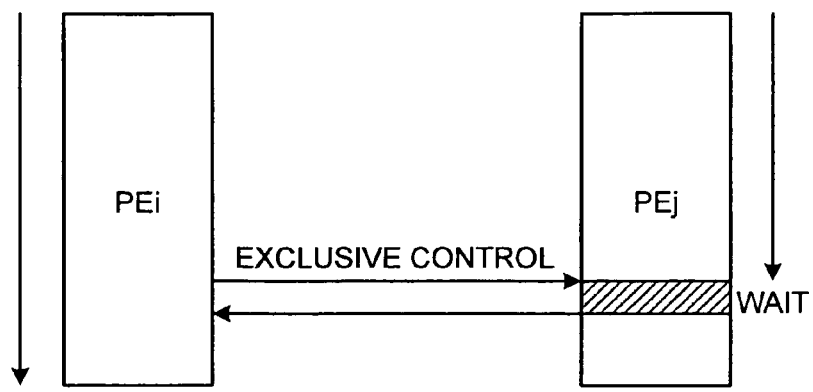
FIG. 8 is a schematic for illustrating a multi-core model simulation according to a first example.

FIG. 8 is schematic for illustrating a multi-core model simulation according to a first example. As shown in FIG. 8, the processor model PEi and the processor model PEj execute the core model processing in parallel. During the execution of the processor model PEi, if the inter-core-model communication to the processor model PEj is detected, the processor model PEi executes an exclusive control for the processor model PEj.

The exclusive control is a control for temporarily excluding the instruction currently being executed in the processor model PEj, which is a communication destination, to occupy the processor model PEj. Specifically, an instruction relating to the instruction currently being executed in the processor model PEi is executed.

For example, by locking the instruction currently being executed in the processor model PEj and by sending variables managed in the processor model PEj to the processor model PEj to apply the variables to the instruction execution function, an interruption with an instruction from the processor model PEi is performed. If the interruption processing from the processor model PEi is finished, the processor model PEi continues the execution and the processor model PEj resumes the execution of the instruction that has been locked.

Figure 9:
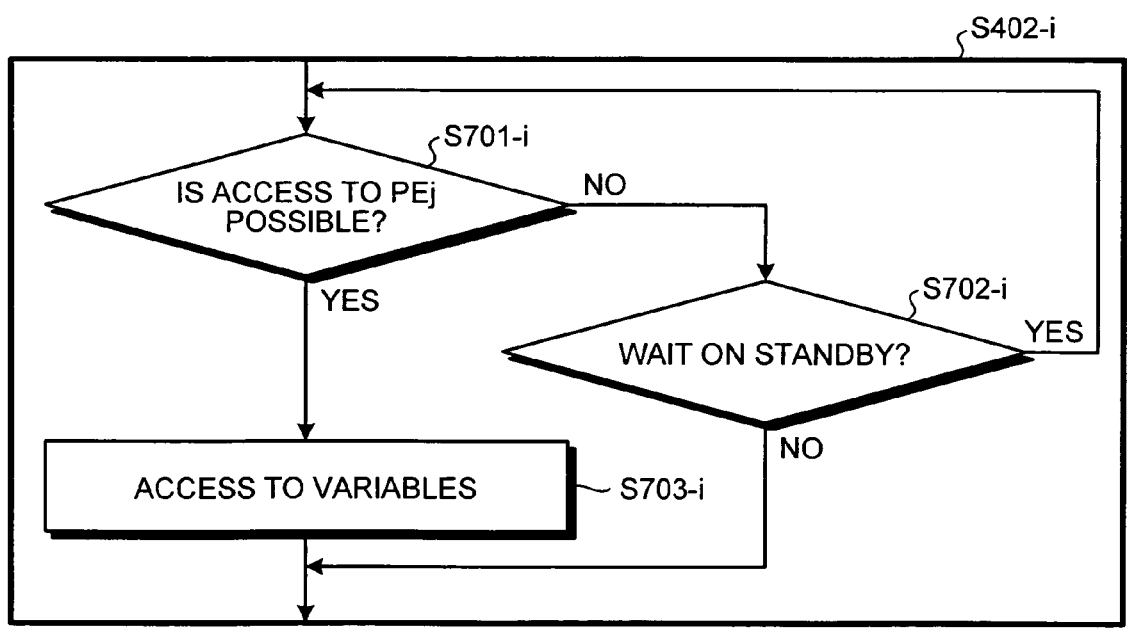
FIG. 9 is a flowchart of an inter-core-model communication processing based on an exclusive control according to the first example.

FIG. 9 is a flowchart of an inter-core-model communication processing based on the exclusive control according to the first example. This flowchart is a detailed flowchart of the inter-core-model communication processing (step S402-i) to the processor model PEj in the processor model PEi shown in FIG. 6.

A shown in FIG. 9, it is determined whether an access to the processor model PEj is possible (step S701-i). In other words, whether variables can be read/written is determined. Specifically, it is determined, for example, based on a flag indicative of information on the exclusive control of another processor model PEj. If another processor model PEj is exclusively controlled, it is determined that the access is impossible, and if another processor model PEj is not exclusively controlled, it is determined that the access is possible.

When it is determined that the access is not possible ("NO" at step S701-i), it is determined whether to wait on standby (step S702-i). Specifically, it is determined whether to retry the access. When it is determine to wait on standby ("YES" at step S702-i), the process returns back to step S701-i. On the other hand, when it is determined not to wait standby ("NO" at step S702-i), the process returns back to step S301-i shown in FIG. 5 to determine whether there is an unexecuted instruction.

When it is determined that access to the processor model PEj is possible ("YES" at step S701-i), variables are accessed (step S703-i). Specifically, variables specified by the processor model PEi are written in a register model of the processor model PEj through the inter-core-model communication. Thus, the variables rewritten in the register model can be applied to the instruction execution function. Subsequently, the process returns back to step S301-i shown in FIG. 5 to determine whether there is an unexecuted instruction.

Figure 10:
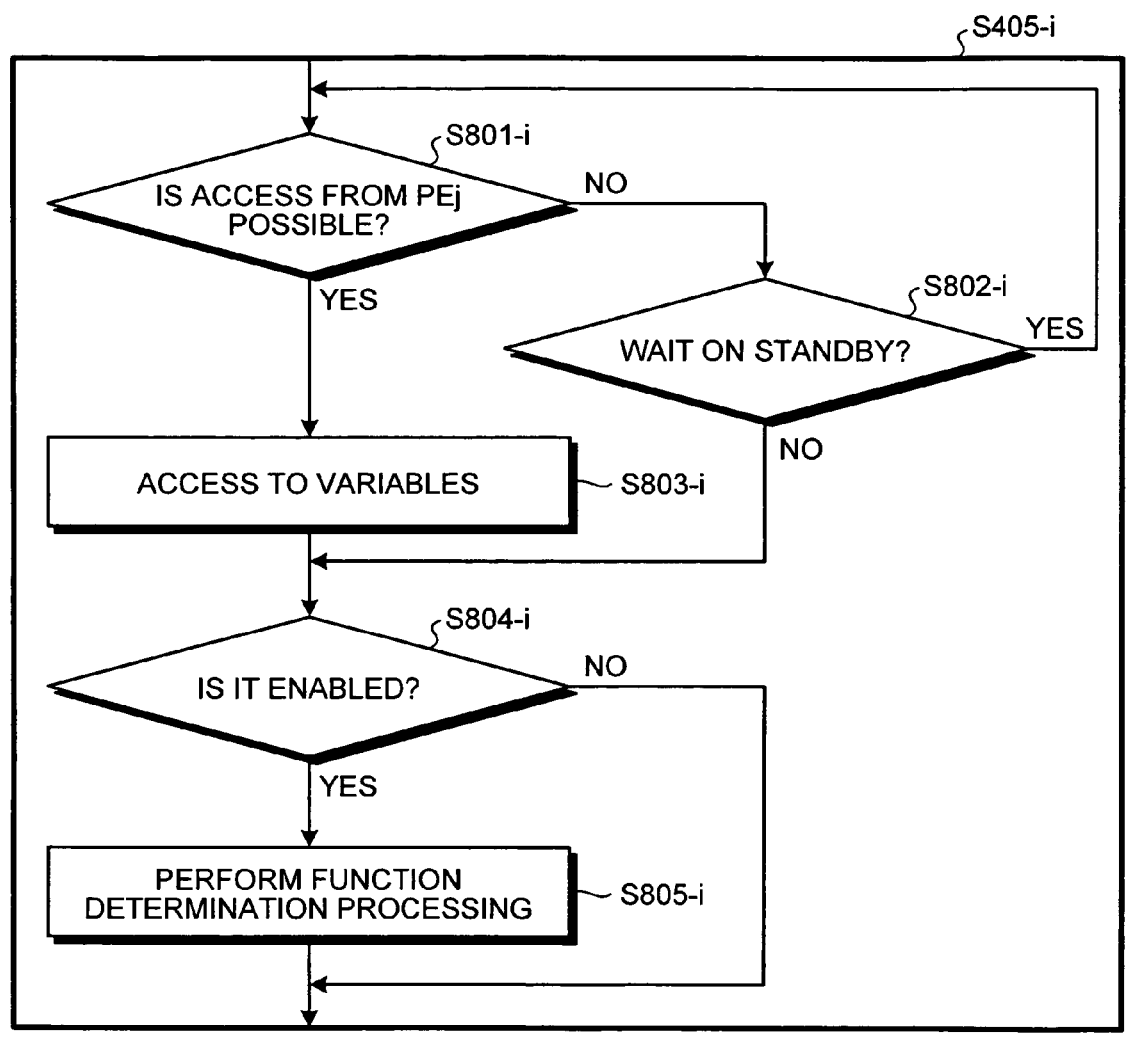
FIG. 10 is a flowchart of a pre-interruption processing under the exclusive control according to the first example.

FIG. 10 is a flowchart of a pre-interruption processing procedure under the exclusive control according to the first example. This flowchart is a detailed flowchart of the pre-interruption processing (step S405-i) to the processor model PEj in the processor model PEi shown in FIG. 6.

As shown in FIG. 10, it is determined whether the access from another processor model PEj is possible (step S801-i). Specifically, it is determined, for example, based on a flag indicative of information on the exclusive control of the processor model PEi. If the processor model PEi is exclusively controlled, it is determined that the access is impossible. If the processor model PEi is not exclusively controlled, it is determined that the access is possible.

When the access is not possible ("NO" at step S801-i), it is determined whether to wait on standby (step S802-i). Specifically, it is determined whether to retry the access. When it is determined to wait standby ("YES" at step S802-i), the process returns back to step S801-i. On the other hand, when it is determined not wait standby ("NO" at step S802-i), the process proceeds to step S804-i.

When the access from another processor model PEj is possible ("YES" at step S801-i), variables are accessed (step S803-i). Specifically, a register model of the processor model PEi is read. It is then determined whether the inter-core-model communication is enabled (step S804-i). Specifically, it is determined whether the variables in the register model have been rewritten by the communication from another processor model PEj.

When it is determined that the inter-core-model communication is not enabled ("NO" at step S804-i), the process proceeds to step S305-i shown in FIG. 5. On the other hand, if the inter-core-model communication is enabled ("YES" at step S804-i), a function determination processing is executed (step S805-i). In the function determination processing, an instruction execution function to be called in the interruption processing (step S305-i) is determined depending on the variables rewritten in the register model. Subsequently, the process proceeds to step S305-i.

According to the first example, by temporarily occupying another processor model PEj with the exclusive control, the core model processing of the processor models PEi, PEj can be synchronized. Therefore, the inter-core-model communication can be performed in parallel with the core model processing and the simulation processing time can be reduced.

In the second example, indirect execution of the inter-core-model communication processing from the processor model PEi to the processor model PEj is explained. The inter-core-model communication processing is executed by performing an exclusive control using a register model or a memory model (hereinafter, "register/memory model") outside the processor models PEi and PEj.

Variables to be accessed in the second example (step S703-i, step S803-i) are global variables common to both the processor models PEi and PEj. An access region is the above-described register/memory model, rather than the register model in the processor models PEi and PEj. Since the processes shown in FIG. 9 and FIG. 10 are the same in the second example except the variables and the access region, the explanation therefor is omitted.

FIG. 11 is a schematic for illustrating a multi-core model simulation according to the second example. The processor model PEi and the processor model PEj execute the core model processing in parallel. If communication to the processor model PEj is detected during the core model processing of the processor model PEi, the processor model PEi executes exclusive control for the processor model PEj.

Specifically, the processor model PEi and the processor model PEj write variables into an accessible register/memory model 900 as shown in a figure (A) in FIG. 11. During writing of the variables, reading of the register/memory model is forbidden for the processor model PEj by the exclusive control. In other words, until the writing is completed, the access to the register/memory model 900 is suspended. When the writing from the processor model PEi is finished, the register/memory model 900 is read by the processor model PEj as shown in a figure (B) in FIG. 11.

Thus, according to the second example, by temporarily forbidding another processor model PEj to access to the register/memory model by the exclusive control, the core model processing of the processor models PEi and PEj can be synchronized. Therefore, the inter-core-model communication can be performed in parallel with the core model processing and the simulation processing time can be reduced.

In a third example, when an interruption from the processor model PEi to the processor model PEj is instructed, the interruption processing is performed in the processor model PEj.

Figure 12:
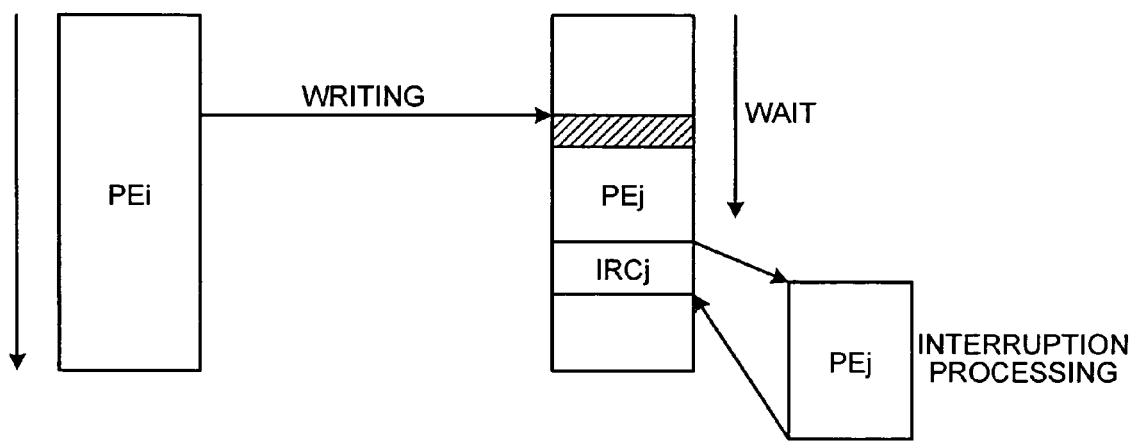
FIG. 12 is a schematic for illustrating a multi-core model simulation according to a third example.
Figure 13:
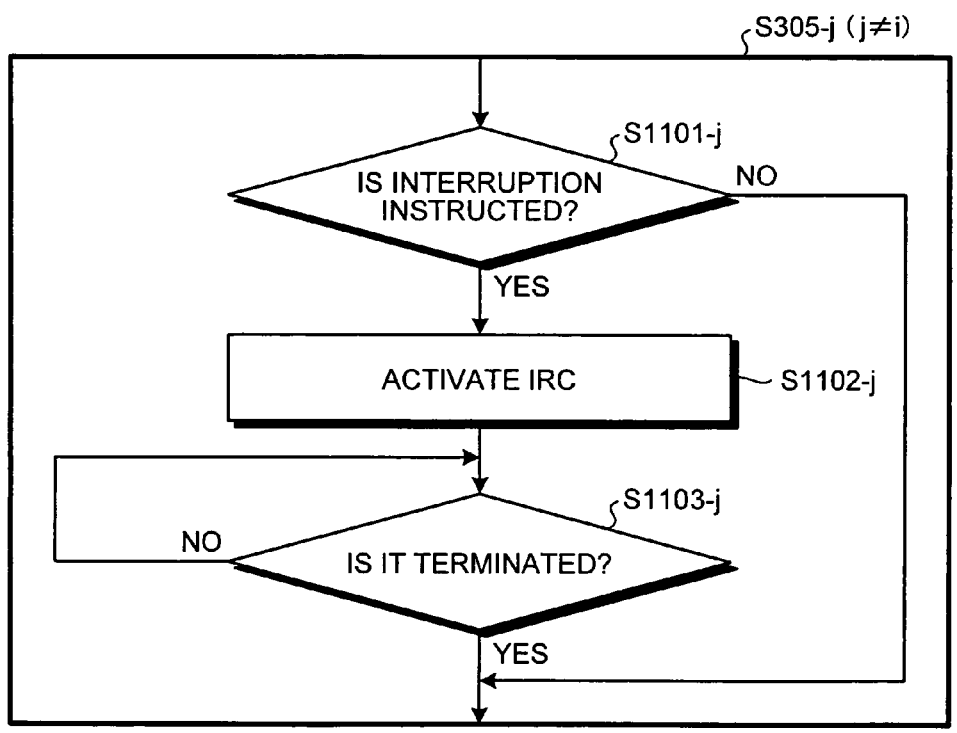
FIG. 13 is a flowchart of the multi-core model simulation according to the third embodiment.

FIG. 12 is a schematic for illustrating a multi-core model simulation according to the third example. FIG. 13 is a flowchart of a multi-core model simulation processing according to the third example. In FIG. 12 and FIG. 13, it is determined in the inter-core-model communication whether an interruption is instructed from the processor model PEi to the processor model PEj (step S1101-j). Specifically, it is determined whether an interruption instruction signal from the processor model PEi is written into a register model in the processor model PEj.

When it is determined that an interruption is not instructed ("NO" at step S1101-j), the process returns back to step S301-j in FIG. 5. On the other hand, when it is determined that an interruption is instructed ("YES" at step S1101-j), the processing is suspended to wait until the writing is completed. After the writing is finished, an interrupt controller IRC of the processor model PEj is activated (step S1102-i). Termination of the execution of the interrupt controller IRC is continuously detected, and when finished ("YES" at step S1103-j), the process returns back to step S301-j FIG. 5.

According to the third example, the interruption processing can be executed in the processor model PEj with the interruption instruction from the processor model PEi while the processor model PEi and the processor model PEj are executed in parallel. Therefore, the simulation processing time can be reduced.

In a fourth example, the multi-core simulation is executed in a barrier mode (barrier algorithm). An actual multi-processor constituted by one chip is synchronized with the same clock or a clock multiplied by a fixed number. If an interruption is performed between the multi-processors at certain timing, processing varies depending timing of the interruption. If the time base and the number of instruction steps cannot be correctly realized, the multi-processor model cannot debug a user program executed on the processor models PEi and PEj. If the number of cycles cannot be counted, an accurate simulation cannot be performed.

Therefore, synchronization between processors is very important for the multi-processor model. In general, a multi-thread program is not synchronized between threads. In other words, a multi-thread program is asynchronous between threads. As described above, although threads are originally asynchronous, a mechanism for synchronization is utilized based on the barrier algorithm. In this way, synchronization can be achieved between the processor models PEi and PEj. With this synchronization, the simulator can perform an interruption between the processor models, an external interruption, synchronization between blocks or on the instruction level, and cycle synchronization.

Figure 14:
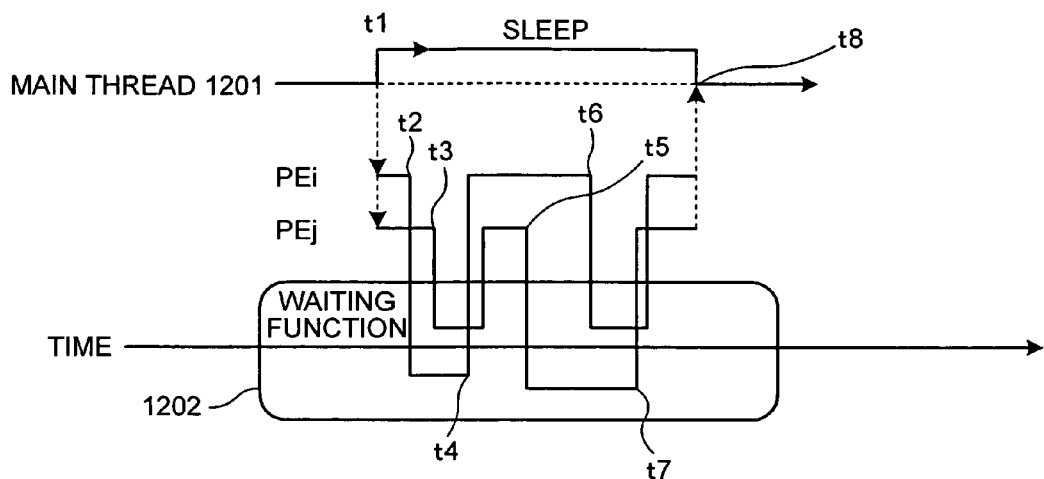
FIG. 14 is a schematic for illustrating a multi-core model simulation according to a fourth example.

FIG. 14 is a schematic for illustrating the multi-core model simulation according to the fourth example. As shown in FIG. 14, synchronization processing is performed based on the barrier algorithm. When a main thread 1201 is executed, at timing t1, the main thread 1201 generates a thread of the processor model PEi and a thread of the processor model PEj, and enters into a sleep state.

The processor model PEi executes instructions to the predetermined execution instruction number of the thread thereof and the processor model PEj executes instructions to the predetermined execution instruction number of the thread thereof. At timing t2, for example, the processor model PEi finishes the execution in first, and is put into a waiting state by a waiting function 1202. At timing t3, the processor model PEj finishes the execution, and is put into a waiting state by the waiting function 1202.

When the processor models PEi and PEj finish the execution, at timing t4, the waiting function 1202 synchronizes the processor models PEi and PEj, and awakes both processor models from the waiting state. The processor model PEi executes subsequent instructions to the predetermined execution instruction number of the thread thereof and the processor model PEj executes subsequent instructions to the predetermined execution instruction number of the thread thereof.

For example, the processor model PEj finishes the execution in first and is put into a waiting state by the waiting function 1202. At timing t6, the processor model PEi finishes the execution and is put into a waiting state by the waiting function 1202.

When the processor core models PEi and PEj finish the execution, at timing t7, the waiting function 1202 synchronizes the processor core models PEi and PEj and awakes both processor core models from the waiting state. The processor core model PEi executes subsequent instructions of the thread thereof and the processor model PEj executes subsequent instructions of the thread thereof.

At timing t8, when the processor core models PEi and PEj finish execution of all the instructions, the main thread 1201 awakes from the sleep state and returns to processing of the main thread 1201.

In this way, when one of processor core models PEi and PEj completes processing to the predetermined execution instruction number in first, the processor core model enters into a waiting state, which is arranged to be released by the other processor core model PEi or PEj. Thus, even in a case in which three or more processor models are provided, synchronization can be achieved by similar operation. When tracing, the processor core models PEi and PEj are executed in parallel. With this synchronization mechanism, synchronization can be achieved at every predetermined execution instruction number and the simulation processing time can be reduced.

Figure 15:
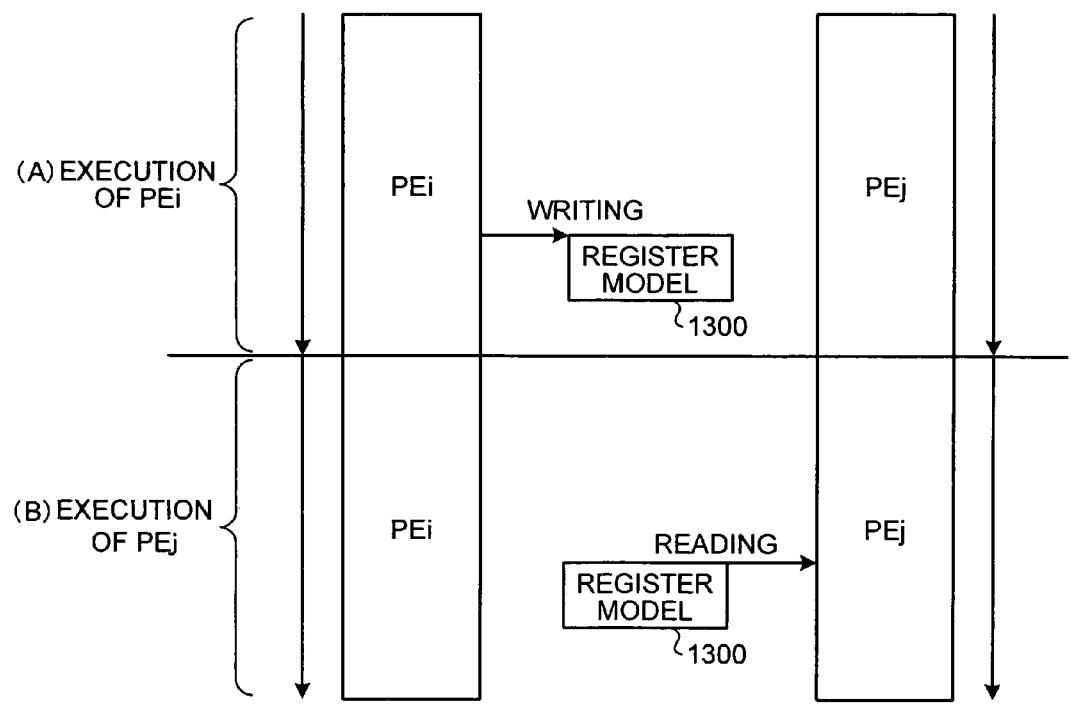
FIG. 15 is a schematic for illustrating a multi-core model simulation according to a fifth example.

In a fifth embodiment, the inter-core-model communication is achieved based on a delay, without using the exclusive control. FIG. 15 is a schematic for illustrating the multi-core model simulation according to the fifth example. As shown in FIG. 15, one processor model PEi (PEj) can write into a register model, and readout must be performed only from the other processor model PEj (PEi). If this condition is not satisfied, an unintended value enters into the register model.

In other words, at a stage (A) shown in FIG. 15, while the processor model PEi and the processor model PEj are executed in parallel, the processor model PEi writes into a register model 1300. Subsequently, at a stage (B) shown in FIG. 15, the processor model PEj reads data written into the register model at the stage (A).

Figure 16:
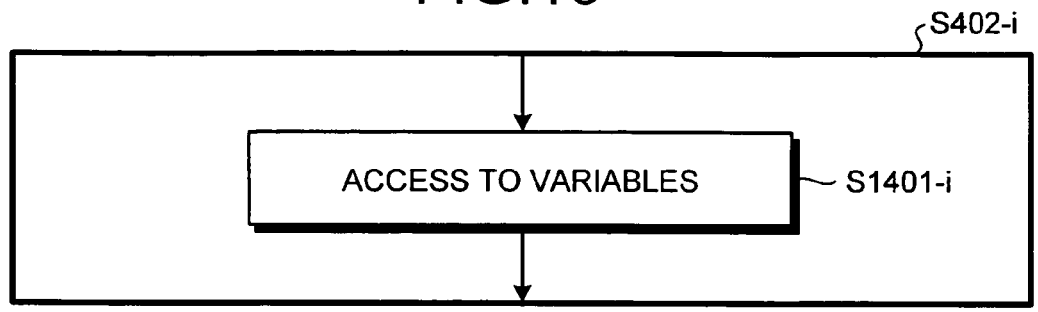
FIG. 16 is a flowchart of an inter-core-model communication processing in a processor model PEi according to the fifth example.

FIG. 16 is a flowchart of an inter-core-model communication processing of the processor model PEi according to the fifth example. This flowchart is a detailed flowchart of the inter-core-model communication processing (step S402-i) to the processor model PEj in the processor model PEi shown in FIG. 6. As shown in FIG. 16, the processor model PEi accesses to variables (step S1401-i). Specifically, the variables are written into the register model. The process returns back to step S301-i.

Figure 17:
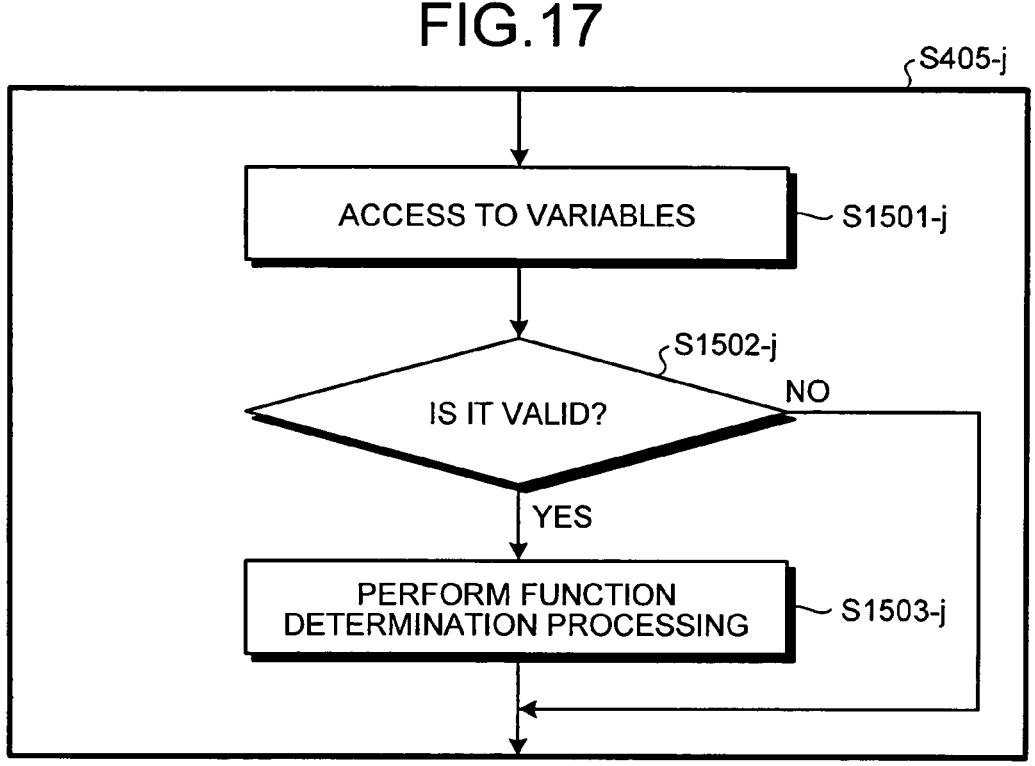
FIG. 17 is a flowchart of a pre-interruption processing procedure of the processor model PEj according to the fifth example.

FIG. 17 is a flowchart of a pre-interruption processing of the processor model PEj according to the fifth example. This flowchart is a detailed flowchart in the case that the pre-interruption processing (step S405-i) of the processor model PEi shown in FIG. 6 is replaced to the processor model PEj.

As shown in FIG. 17, variables are accessed (step S1501-j). Specifically, after the variables are written into the register model by the processor model PEi as shown in FIG. 16, the variables are read from the register model. It is determined whether the processing in step S1501-j is valid (step S1502-j). Specifically, it is determined whether the read variables are data written by the processor model PEi before the readout.

When it is determine that the processing is not valid ("NO" at step S1502-j), the process goes to interruption processing of the processor model PEj shown in FIG. 5. On the other hand, when it is determined that the processing is valid ("YES" at step S1502-j), a function determination processing is executed (step S1503-j). In the function determination processing, an instruction execution function to be called in the interruption processing of the processor model PEj is determined depending on the variables rewritten in the register model. The process goes to the interruption processing of the processor model PEj shown in FIG. 5.

According to the fifth example, while the processor model PEi and the processor model PEj is executed in parallel, read/write to/from the register model can be accurately executed without performing the synchronization control. Therefore, with a simple control, the simulation processing time can be reduced.

Figure 18:
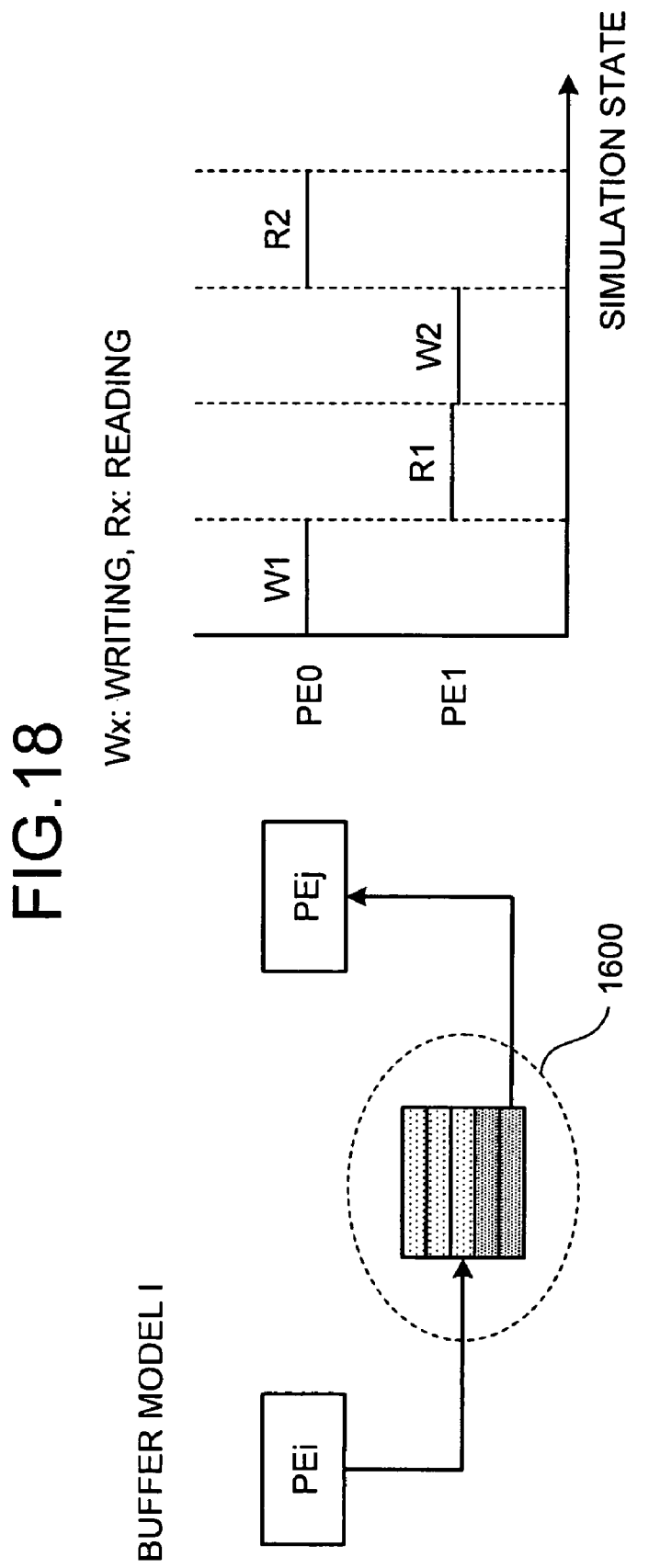
FIG. 18 is a schematic for illustrating a multi-core model simulation according to a sixth example.

In a sixth example, the inter-core-model communication is executed with the exclusive control based on a buffer model. FIG. 18 is a schematic for illustrating a multi-core model simulation according to the sixth example. FIG. 18 illustrates an example in which a single buffer model is used. As shown in FIG. 18, the processor model PEi (PEj) writes variables into a buffer model and the processor model PEj (PEi) reads the variables written into the buffer model 1600.

For example, the processor model PEi writes variables (W1). After the writing (W1), readout (R1) is performed by the processor model PEj. After the readout (R1), the processor model PEj writes variables into the buffer model 1600 (W2). After the writing (W2), readout (R1) from the buffer model 1600 is performed by the processor model PEi.

With the exclusive control for waiting the readout (Rx) until the writing (Wx) is completed, synchronization can be achieved while the processor model PEi and the processor model PEj are executed in parallel. Therefore, the simulation processing time can be reduced.

Figure 19:
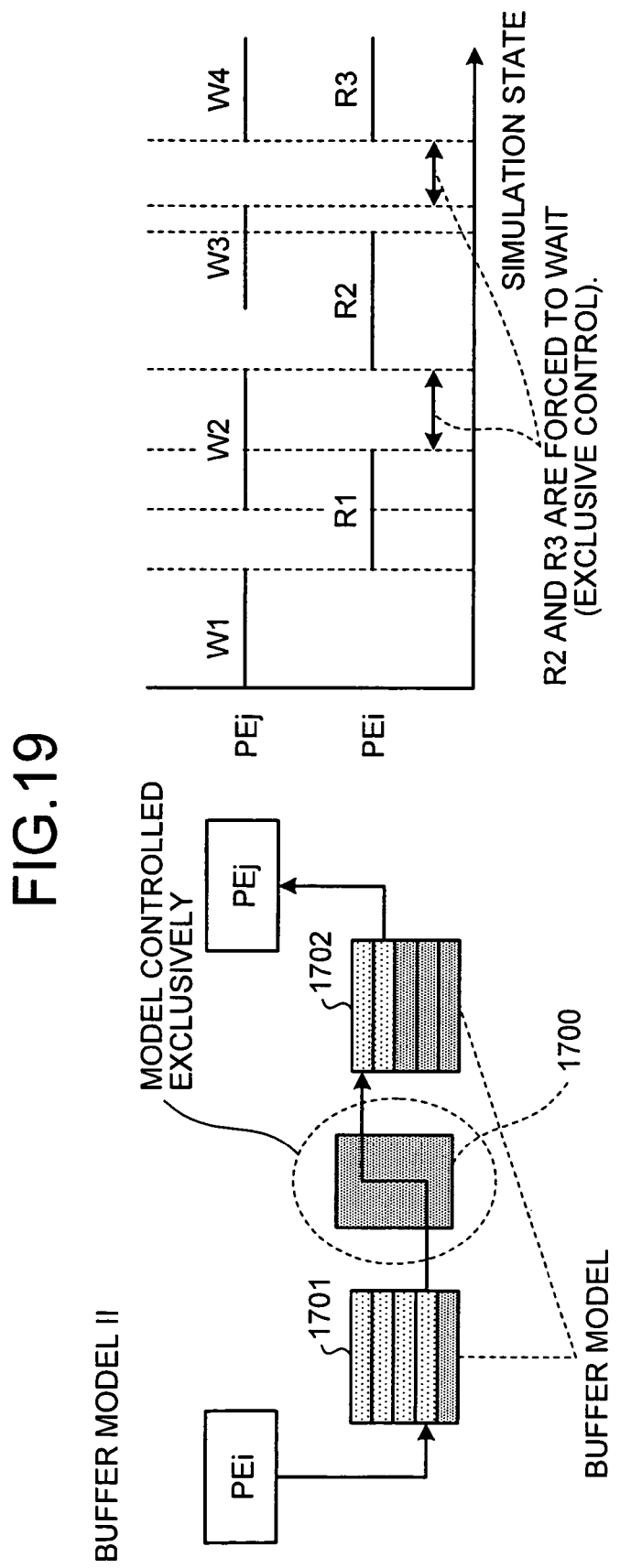
FIG. 19 is a schematic for illustrating another multi-core model simulation according to the sixth example.

FIG. 19 is a schematic for illustrating another multi-core model simulation according to the sixth example. FIG. 19 illustrates an example in which plural buffer models are used. As shown in FIG. 19, variables are written into a buffer model 1701 from the processor model PEi (PEj). Read/write of the buffer model 1701 is performed only by the processor model PEi.

The variables written into the buffer model 1701 are sequentially transferred by a transfer block 1700 to a buffer model 1702. The variables written into the buffer model 1702 can also be sequentially transferred to the buffer model 1701. Read/write of the buffer model 1702 is performed only by the processor model PEj.

For example, variables are written into the buffer model 1701 from the processor model PEi (W1). After the writing (W1), the variables written into the buffer model 1701 are transferred by the transfer block 1700 to the buffer model 1702 and read out (R1) by the processor model PEj.

During the readout (R1), the processor model PEi newly writes variables into the buffer model 1701 (W2). After the writing (W2), the variables written into the buffer model 1701 are transferred by the transfer block 1700 to the buffer model 1702 and read out (R2) by the processor model PEj.

During the readout (R2), the processor model PEi newly writes variables into the buffer model 1701 (W3). After the writing (W3), the variables written into the buffer model 1701 are transferred by the transfer block 1700 to the buffer model 1702 and read out (R3) by the processor model PEj. Concurrently with this readout (R3), the processor model PEi newly writes variables into the buffer model 1701 (W4).

Figure 20:
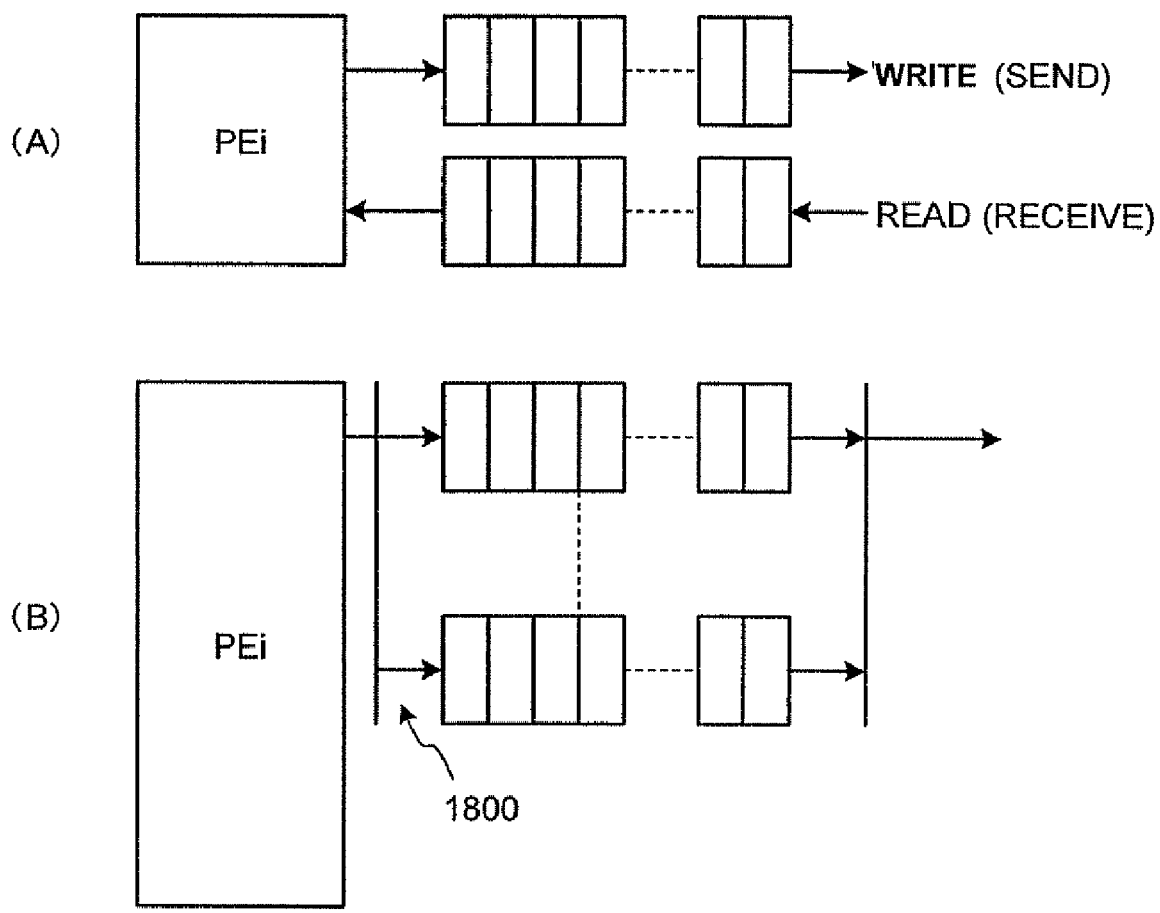
FIG. 20 is a schematic of a buffer configuration on a writing side.

FIG. 20 is a schematic of a buffer configuration on a writing side. A figure (A) shown in FIG. 20 illustrates a case of using a single buffer model shown in FIG. 18. The processor model PEi performs the writing and the readout for the buffer model 1600. The processor PEj side has the same configuration.

A figure (B) illustrates the case of using more than one buffer models shown in FIG. 19. The processor model PEi switches the writing and the readout for the buffer model 1600 with a selector 1800. The processor PEj side has the same configuration.

With the exclusive control for waiting the readout (Rx) until the writing (Wx) is completed, synchronization can be achieved while when the processor model PEi and the processor model PEj are executed in parallel. Since the new writing can be performed into the transfer-source buffer model 1701 during the readout of the transfer-destination buffer model 1702, read/write can be performed for different variables at the same time. Therefore, the simulation processing time can be reduced.

In a seventh example, a mode for realizing the data transfer processing in the first embodiment to the sixth example is explained. This mode includes three data transfer modes that are single transfer between one core model and one core model, multi transfer between one core model and plural core models, and parallel transfer mixing transfer between one core model and one core model, and transfer between one core model and plural core models.

Figure 21:
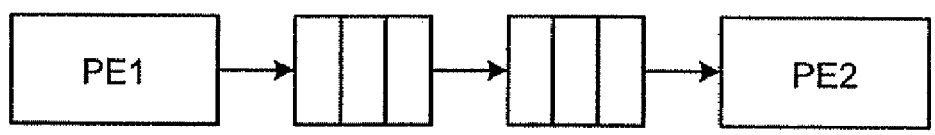
FIG. 21 is a schematic for illustrating single transfer between one core model and one core model.

FIG. 21 is a schematic for illustrating single transfer between one core model and one core model. FIG. 21 illustrates an example of transferring data from a processor model PE1 to a processor model PE2.

Figure 22:
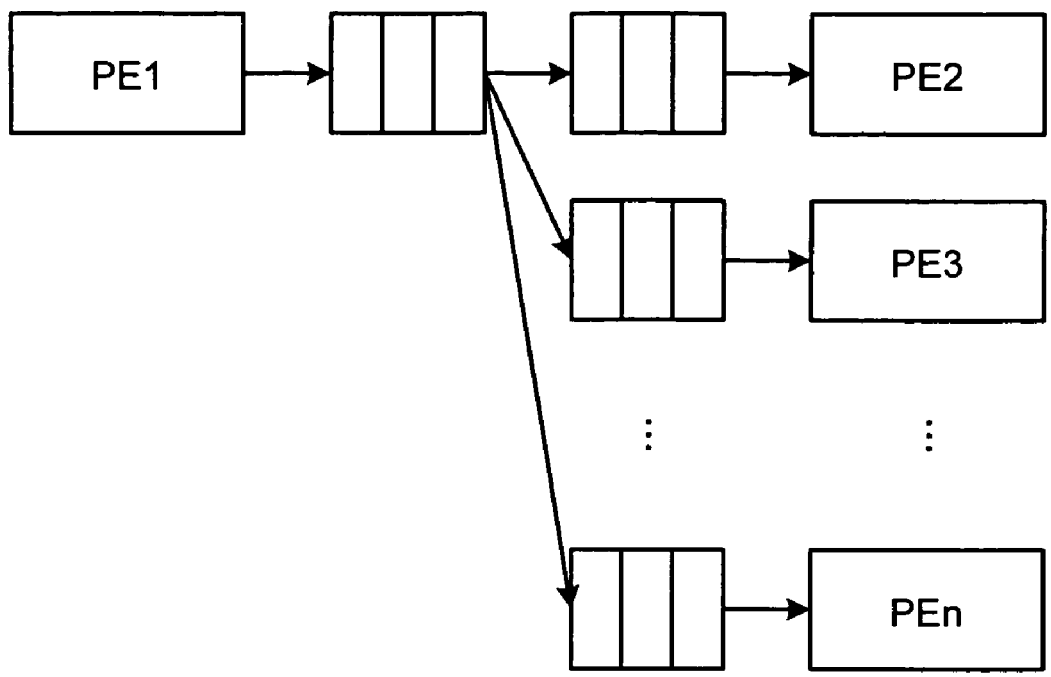
FIG. 22 is a schematic for illustrating multi transfer between one core model and plural core models.

FIG. 22 is a schematic for illustrating multi transfer between one core model and plural core models. Data is transferred from a processor model PE1 to processor models PE2 to PEn.

Figure 23:
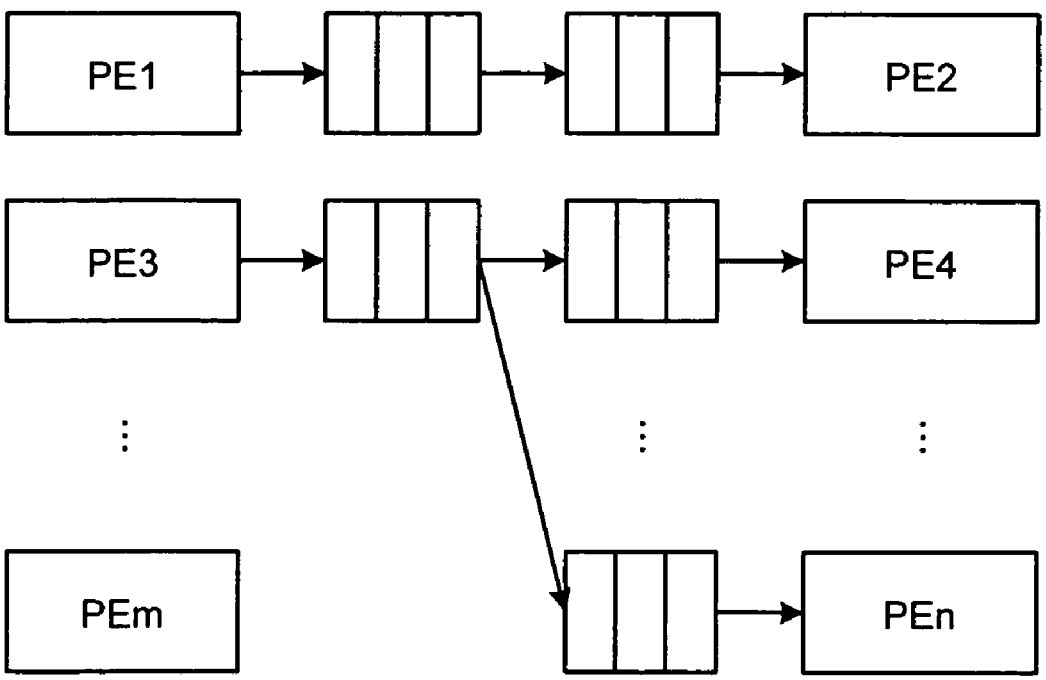
FIG. 23 is a schematic for illustrating parallel transfer.

FIG. 23 is a schematic for illustrating parallel transfer. In an example shown in FIG. 23, among processor models PE1 to PEm, a processor model PE1 transfers data to a processor model PE2 and a processor model PE3 transfers data to processor models PE4 to PEn.

As described above, according to the embodiments of the present invention, by synchronizing plural processor models, the inter-core-model communication can be accelerated between the processor models. The timing of the synchronization can be matched with the arbitrary instruction execution number. By concurrently executing plural processor models, the inter-core-model communication can be achieved bi-directionally between processor models. By threading the inter-core-model communication processing after synchronization, the inter-core-model communication processing time can be is hidden behind the simulation processing time between processor models to realize synchronization at the cycle level of the multi core model simulator.

According to the embodiments described above, the development period can be reduced while improving credibility and speed of a multi-core model simulation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a simulation program for controlling a computer which when executed on the computer performs a process for executing a plurality of core models in parallel, comprising:
synchronizing an instruction being executed by a first core model and an instruction being executed by a second core model;
causing the first core model to determine whether an access to the second core model is possible, and to access the second core model when it is determined that the access is possible; and
causing the second core model to suspend the instruction being executed by the second core model, to execute an instruction from the first core model, and to resume execution of suspended instruction after execution of the instruction from the first core model is completed.

2. The computer-readable recording medium according to claim 1, wherein the simulation program further makes the computer execute:
causing communication from the first core model to a memory model that receives communication from the second core model;
stopping communication from the second core model to the memory model; and
causing communication from the second core model to the memory model, after communication from the first core model to the memory model is finished.

3. The computer-readable recording medium according to claim 1, wherein the simulation program further makes the computer execute:
causing communication for instructing interruption processing from the first core model to the second core model; and
causing the second core model to execute an interruption processing based on the instruction.

4. The computer-readable recording medium according to claim 1, wherein the simulation program further makes the computer execute:
detecting a core model that finishes last on execution among the core models; and
starting new execution of the core models based on a result of detection.

5. The computer-readable recording medium according to claim 1, wherein the simulation program further makes the computer execute:
causing communication for writing data from the first core model to a first memory model;
transferring written data from the first memory model to a second memory model; and
causing communication for reading transferred data from the second memory model to the second core model.

6. The computer-readable recording medium according to claim 5, wherein the simulation program further makes the computer execute causing another communication for writing new data from the first core model to the first memory model, during the communication for reading the data.

7. A simulation method for executing a plurality of core models in parallel, comprising:
synchronizing an instruction being executed by a first core model and an instruction being executed by a second core model;
causing the first core model to determine whether an access to the second core model is possible, and to access the second core model when it is determined that the access is possible; and
causing the second core model to suspend the instruction being executed by the second core model, to execute an instruction from the first core model, and to resume execution of suspended instruction after execution of the instruction from the first core model is completed.

8. The simulation method according to claim 7, further comprising:
causing communication from the first core model to a memory model that receives communication from the second core model;
stopping communication from the second core model to the memory model; and
causing communication from the second core model to the memory model, after communication from the first core model to the memory model is finished.

9. A simulation method for executing a plurality of processor core models, comprising:
synchronizing an instruction execution in a first core model with an instruction execution in a second core model;
causing the first core model to determine whether an access to the second core model is possible, and to access the second core model when it is determined that the access is possible;
causing the second core model to suspend the instruction being executed by the second core model;
executing an instruction from the first core model in the second core model and executing an instruction in the first core model in parallel; and
resuming execution of suspended instruction after execution of the instruction from the first core model is completed in the second core model.

* * * * *